United States Patent
Blanks et al.

(10) Patent No.: US 10,142,030 B1
(45) Date of Patent: Nov. 27, 2018

(54) M-ARY FREQUENCY PRESENCE MODULATION COMMUNICATION SYSTEM AND METHOD

(71) Applicant: BOOZ ALLEN HAMILTON INC., McLean, VA (US)

(72) Inventors: Keith A. Blanks, Colorado Springs, CO (US); Jason Aspiotis, Melbourne, FL (US)

(73) Assignee: BOOZ ALLEN HAMILTON INC., McLean, VA (US)

( * ) Notice: Subject to any disclaimer, the term of this patent is extended or adjusted under 35 U.S.C. 154(b) by 0 days.

(21) Appl. No.: 15/835,086

(22) Filed: Dec. 7, 2017

(51) Int. Cl.
  *H04B 10/556* (2013.01)
  *H04B 10/54* (2013.01)
  *H04B 10/118* (2013.01)
  *H04B 10/50* (2013.01)
  *H04L 27/156* (2006.01)

(52) U.S. Cl.
  CPC ....... *H04B 10/5563* (2013.01); *H04B 10/118* (2013.01); *H04B 10/503* (2013.01); *H04B 10/541* (2013.01); *H04L 27/1563* (2013.01)

(58) Field of Classification Search
  None
  See application file for complete search history.

(56) References Cited

U.S. PATENT DOCUMENTS

| | | | | |
|---|---|---|---|---|
| 2003/0043471 | A1* | 3/2003 | Belser | G02B 6/2931 359/634 |
| 2006/0222290 | A1* | 10/2006 | Yamashita | G02B 6/3586 385/18 |
| 2010/0221002 | A1* | 9/2010 | Ooi | G02B 6/2931 398/48 |

OTHER PUBLICATIONS

Gennady P. Berman et al., "High Data-rate, Free-space Laser Communication Based on Frequency Encoding of a Partially Coherent Beam;" Los Alamos National Laboratory, pp. 98-99.
Gennady P. Berman et al., "Suppression of intensity fluctuations in free space high-speed optical communication based on spectral encoding of a partially coherent beam;" Science Direct, Optics Communications 280, Aug. 2007, pp. 264-270.
Gennady P. Berman et al., "High Data-rate, Free-space Laser Communication Based on Frequency Encoding of a Partially Coherent Beam;" Los Alamos National Laboratory, 2009, pp. 98-99.
Chihiro Yamanka et al., "Development of a terawatt coherent white light lidar system and applications to environmental studies;" Multispectral, Hyperspectral, and Ultraspectral Remote Sensing Technology, Techniques, and Applications II, Proc. of SPIE vol. 7149, 71490Z, 2008, pp. 1-8.

* cited by examiner

*Primary Examiner* — Darren E Wolf
(74) *Attorney, Agent, or Firm* — Buchanan Ingersoll & Rooney PC

(57) ABSTRACT

An optical communication system that includes a data transmitter. The data transmitter includes at least one optical emission device configured to output light energy as an optical beam having an operating bandwidth; a beam dividing device arranged to receive and divide the operating bandwidth of the optical beam into bandwidth portions of plural communication bands; a focusing grating; and a digital mirror array having a plurality of digital mirrors. In an imaging mode, the optical communication system is configured to perform hyperspectral imaging by setting all of the plurality of digital mirrors to positions that transmit all wavelengths of a communication band among the plural communication bands to the focusing grating.

15 Claims, 13 Drawing Sheets

M-ARY FREQUENCY PRESENCE MODULATION COMMUNICATION SYSTEM AND METHOD

FIELD

The present disclosure relates to a communication system and method that uses M-ARY frequency presence modulation.

BACKGROUND

Existing satellite laser communications systems utilize narrow bandwidth (<2 nanometer) sources and modulation techniques, such as Binary Phase Shift Keying (BPSK) for the extant European Data Relay System (EDRS), and Differential Phase Shift Keying (DPSK) for NASA's Laser Communication Relay Demonstration (LCRD). These systems rely on the speed of phase shifting near infrared telecommunications electronics for data encoding, not the available bandwidth of the source.

A paper entitled "Suppression of intensity fluctuations in free space high-speed optical communication based on spectral encoding of a partially coherent beam" in Science Direct, Optics Communications 280, August 2007, pages 264-270, by Gennady P. Berman et al. describes a free space, high-speed (Gbps) optical communication system based on spectral encoding of radiation from a broadband pulsed laser. This paper describes that scintillations can be suppressed by orders of magnitude for distances of more than 10 km with the use of partially coherent laser beams and a relatively slow photosensor.

A paper entitled "High Data-rate, Free-space Laser Communication Based on Frequency Encoding of a Partially Coherent Beam" by Gennady P. Berman et al., Los Alamos National Laboratory, describes a free-space, high-speed optical communication (FSOC) system based on spectral encoding of radiation from a broadband, pulsed laser. This paper proposes to extend a technique of scintillation suppression, based on time averaging of a partially coherent beam, to a gigabit data rate FSOC.

A paper entitled "Development of a terawatt coherent white light lidar system and applications to environmental studies" by Chihiro Yamanka et al., Multispectral, Hyperspectral, and Ultraspectral Remote Sensing Technology, Techniques, and Applications II, Proc. Of SPIE Vol. 7149, 71490Z, 2008, describes a white light lidar system which uses an intense femtosecond laser pulse and self-trapping in atmospheric-pressure of Kr gas to obtain multi-wavelength backscattering and depolarization profiles from aerosols and clouds.

SUMMARY

An exemplary embodiment of the present disclosure provides an optical communication system that includes a data transmitter. The data transmitter includes at least one optical emission device configured to output light energy as an optical beam having an operating bandwidth; a beam dividing device arranged to receive and divide the operating bandwidth of the optical beam into bandwidth portions of plural communication bands; a focusing grating; and a digital mirror array having a plurality of digital mirrors. In an imaging mode, the optical communication system is configured to perform hyperspectral imaging by setting all of the plurality of digital mirrors to positions that transmit all wavelengths of a communication band among the plural communication bands to the focusing grating.

An exemplary embodiment of the present disclosure provides a method for optical communication, the method including: outputting, by at least one optical emission device, light energy as an optical beam having an operating bandwidth on to a beam dividing device; dividing, by the beam dividing device, the operating bandwidth of the optical beam into bandwidth portions of plural communication bands; and performing, by a digital mirror array having a plurality of digital mirrors, hyperspectral imaging by setting all of the plurality of digital mirrors to positions that transmit all wavelengths of a communication band among the plural communication bands to a focusing grating.

BRIEF DESCRIPTION OF THE DRAWINGS

The scope of the present disclosure is best understood from the following detailed description of exemplary embodiments when read in conjunction with the accompanying drawings, wherein.

DETAILED DESCRIPTION

Figure 1:
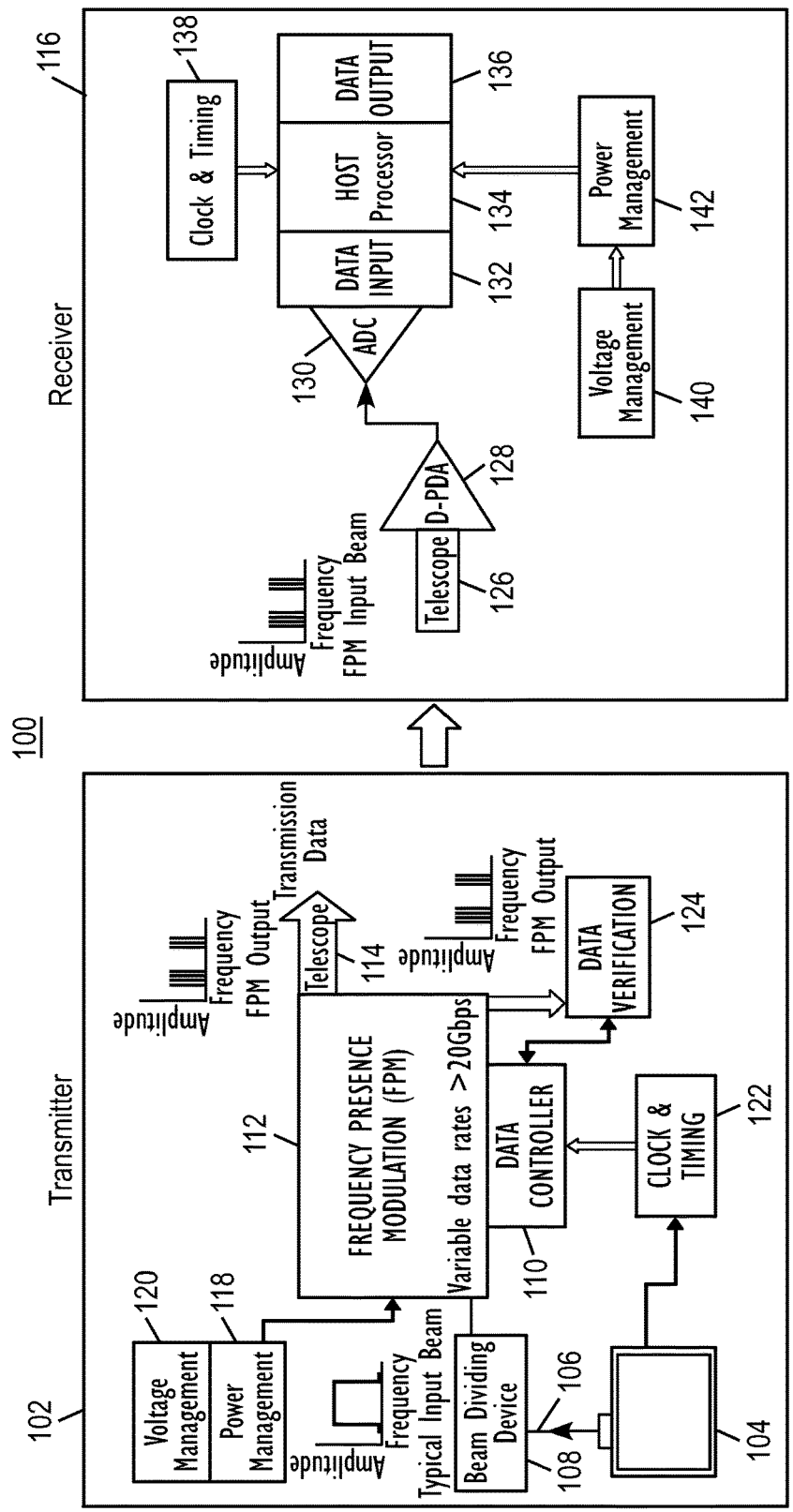
FIG. 1 is a block diagram illustrating a system hardware architecture in accordance with an exemplary embodiment.

The present disclosure is directed to an optical communication system that performs M-ary frequency presence modulation to capitalize on the available bandwidth of an optical emission device (i.e., laser, LED, etc.) to encode data for data transmission. The optical communication system can also perform active hyperspectral imaging, and thus the system has dual uses. M-ary transmission is a type of digital modulation where instead of transmitting one bit at a time, two or more bits are transmitted simultaneously. M-ary is multilevel signaling communication where M=number of discrete signal or voltage levels, N=number of bits, and $M=2^N$. M-ary can be used to design a communication system that is bandwidth efficient. The transmitter considers 'N' bits at a time, and it produces one of M signals where $M=2^N$. This type of transmission results in reduced channel bandwidth. The optical communication system can achieve data transmission rates that are for example equal to or greater than 20 Gigabits per second (Gbps), and can transmit data over distances greater than 30 km (plus or minus ten percent) under nominal field conditions. Data can be transmitted over distances less than 30 km. Data rates can be validated using the 100 Gigabit Ethernet (100 GbE) standard.

The optical communication system can be used for terrestrial, airborne, and space optical communications, for example. System and methods of the present disclosure use frequency presence modulation of the operating bandwidth of the optical emission device for very high data rate, variable data rate, or moderate date rate optical communications. M-ary frequency presence modulation enables very high throughput, and a single optical emission device results in more than a 50% reduction in size, weight, and power envelope compared to approaches using multiple optical emission devices. The M-ary frequency presence modulation schema uses a presence and absence of spectral content within the operating bandwidth of the optical emission device (i.e., the transmission source). For ultra-wide bandwidth emission sources (e.g., lasers, light emitting diodes, etc.), the spectral content of the optical emission device is first spectrally segregated into individual communication bands, followed by channelization of the spectral content within the band. Channel content is electronically and optically directed to, or removed from the transmission path. For narrow bandwidth optical emission devices, the functionality of the M-ary frequency presence modulation schema is unchanged from when an ultra-wide bandwidth optical emission device is used, although the electronic and optical components may differ from those used for ultra-wide bandwidth transmission.

The optical communication system of the present disclosure can be used as a free space optical (FSO) communications network. The benefits of a FSO communications network span every telecommunications mission that intends to leave Earth's atmosphere. The use of free space optical networks has been envisioned as a desirable alternative to radio based communications technology for a variety of reasons. Presently, free space optical networks do not compete for frequency space allocation. Optical communications are inherently more secure than radio based communications, have the side benefit of ranging an order of magnitude better than presently employed radio frequency tracking techniques, and offer reduced size, weight, and power burden.

FIG. 1 shows an optical communication system 100 in accordance with an exemplary embodiment. The optical communication system 100 includes a data transmitter 102 and a data receiver 116. The data transmitter 102 includes at least one optical emission device 104 configured to output light energy as an optical beam 106 having an operating bandwidth. For example, the operating bandwidth could be 1600 nanometers. However, the bandwidth could be any nanometer range. In an exemplary embodiment, the at least one optical emission device 104 can be, for example, an ultra-wide bandwidth (for example, greater than 1,000 nm) laser or an ultra-wide bandwidth (for example, greater than 300 nm) light emitting diode (LED). The at least one optical emission device 104 can also be, for example, a narrow band laser (for example, less than 5 nm) or a narrow band (for example, less than 5 nm) light emitting diode. For example, the optical emission device 104 can be a commercially available deep red LED based transmitter with the appropriate H-alpha filters in order to only transmit within the H-alpha band. In an exemplary embodiment, the at least one optical emission device 104 is a single optical emission device. In an exemplary embodiment, the optical emission device 104 is a laser with approximately 1600 nm of bandwidth (e.g., anywhere between 1500 to 1800 nm) per pulse and is un-polarized (i.e., contains both vertical and horizontal polarized light). The laser pulse repetition rate can be, for example, 60 MHz. However, any repetition rate can be used.

The data transmitter 102 also includes a beam dividing device 108 arranged to receive and divide the operating bandwidth of the optical beam 106 into plural communication bands. In an exemplary embodiment, the beam dividing device 108 is, for example, at least one spectral bandpass filter, etc. The ultra-wide bandwidth of the optical emission device 104 is spectrally separated into bands of a user defined bandwidth via the beam dividing device 108. In an exemplary embodiment, each of the plural communication bands has the same bandwidth. For example, if the optical emission device 104 is a laser with approximately 1600 nm of bandwidth, a 100 nm spectral bandpass filter yields 16 independent bands each having 100 nm bandwidth, a 50 nm spectral bandpass filter yields 32 independent bands each having 50 nm bandwidth, etc.

Figure 7:
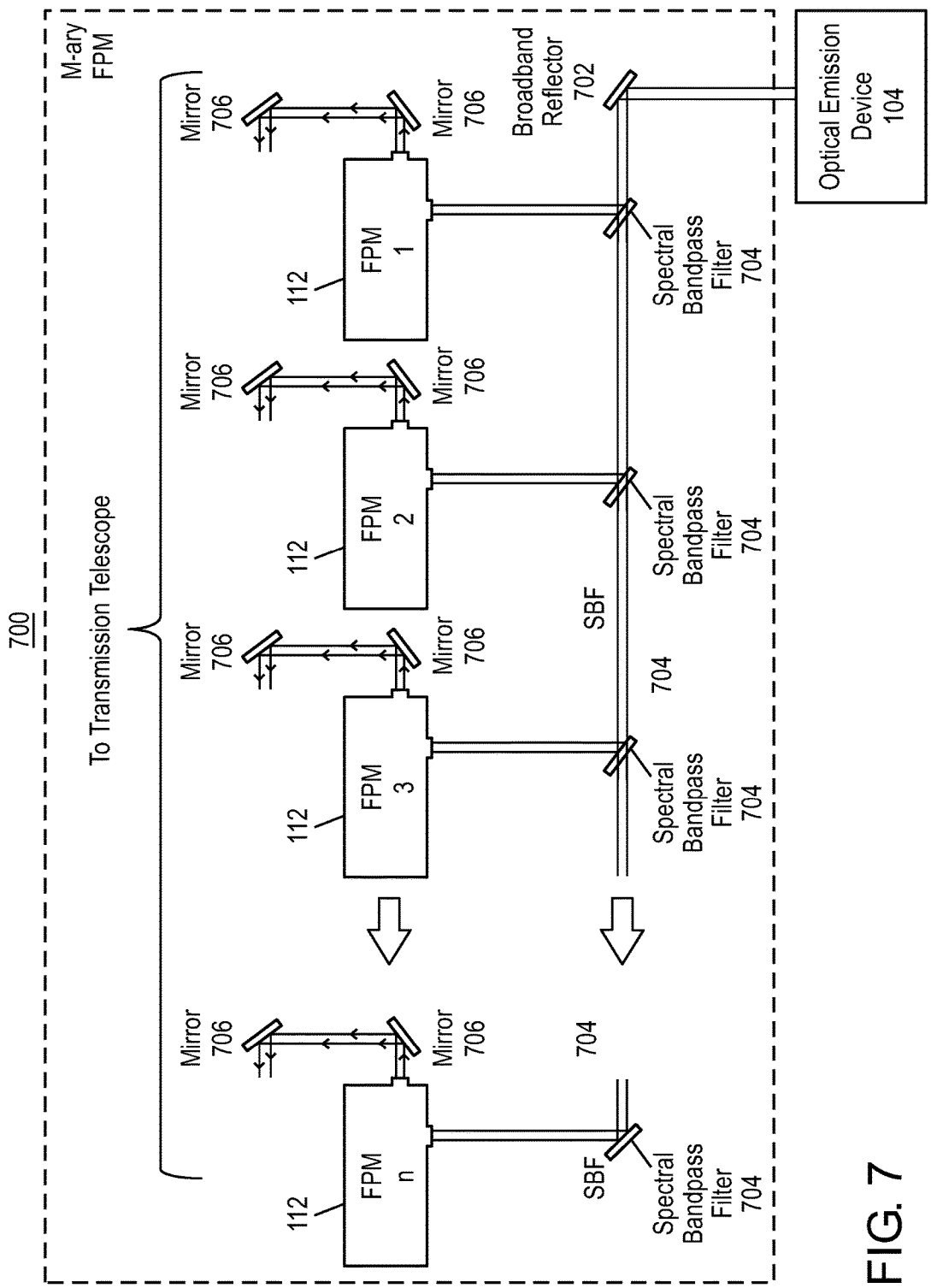
FIG. 7 is a block diagram illustrating a system hardware architecture in accordance with an exemplary embodiment.

The data transmitter 102 also includes a frequency presence modulation unit 112 configured to spectrally segregate the bandwidth of at least one communication band into plural channels. That is, the frequency presence modulation unit 112 is used to encode (channelize) data within the pulse emitted by the optical emission device 104. In an exemplary embodiment, a frequency presence modulation unit 112 is used for each band that has been spectrally separated within the bandwidth of the optical emission device 104. For example, if the optical emission device 104 is divided into sixteen 100 nm bands, sixteen frequency presence modulation units 112 can be used to channelize each individual band separately. Each of the sixteen frequency presence modulation units 112 would channelize bands having different frequencies. This is illustrated in FIG. 7, where there are n frequency presence modulation units 112. FIG. 7 shows how the n frequency presence modulation units 112 are connected to the telescope 114 and the optical emission device 104, and will be discussed in further detail later.

Figure 6:
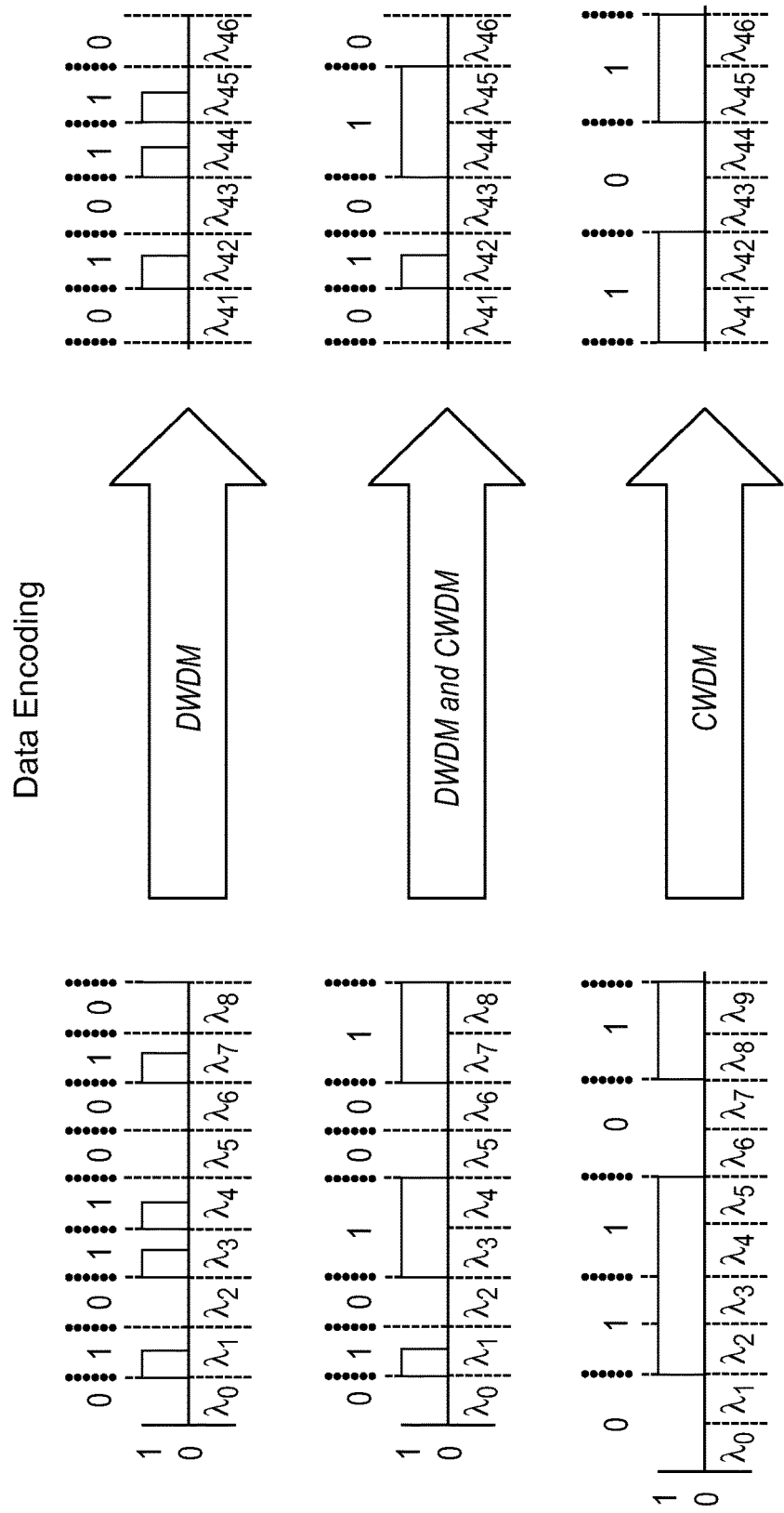
FIG. 6 illustrates data encoding performed in accordance with an exemplary embodiment.

The number of channels per band is adjustable depending on the data rates the optical communication system 102 is built/designed to achieve. For very high data rates (>1 Gbps) per band dense wavelength (bandwidth <2 nm) channelization could be used. For example, the channel bandwidth could be between 1-2 nm, such as 1.8 nm. Coarse wavelength (bandwidth >2 nm) channelization can be used for data rates of 100's of Mbps. For example, the channel bandwidth could be 5 nm. The channels in a band can have the same bandwidth or different bandwidths as shown in FIG. 6. For example, the upper illustration in FIG. 6 is an example of Dense Wave Division Multiplexing (DWDM), and shows all of the channels within one band having the same bandwidth. The lower illustration in FIG. 6 is an example of Coarse Wave Division Multiplexing (CWDM), and shows all of the channels within one band having the same bandwidth. The bandwidth of one channel in the lower illustration of FIG. 6 is approximately twice the bandwidth of one channel in the upper illustration of FIG. 6. The middle illustration in FIG. 6 is an example of both DWDM and CWDM, and at least one channel in the band has a different bandwidth than another channel in the same band. Simultaneous dense and course wavelength channelization enables variable data rates.

The frequency presence modulation unit 112 is also configured to modulate the bandwidth to selectively produce an optical output signal (i.e., the frequency presence modulation output beam) with wavelengths that correspond to one or more of the channels, wherein the presence and absence of energy within channels of the communication band will constitute an information packet for data communication. This is illustrated in FIG. 6, in which the presence of energy within a channel represents a logic 1 value, and the absence of energy in a channel represents a logic 0 value.

Figure 2:
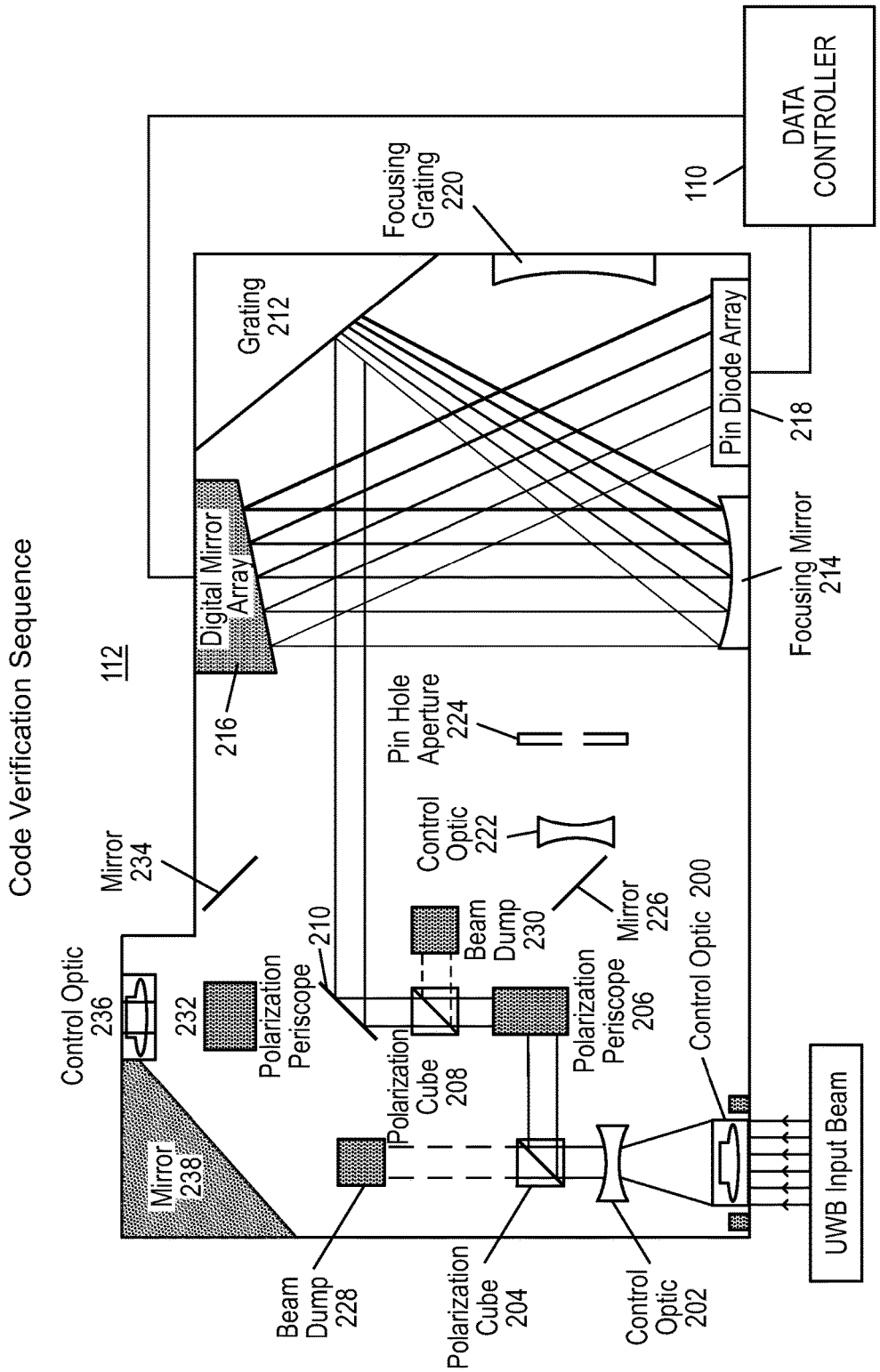
FIG. 2 illustrates a hardware architecture of a frequency presence modulation unit in accordance with an exemplary embodiment.

FIG. 2 is an exemplary embodiment showing the hardware architecture of the frequency presence modulation unit 112 during a code verification sequence, which is a mode in which a beam is not outputted from the frequency presence modulation unit 112 (i.e., a non-transmit mode). In FIG. 2, the frequency presence modulation unit 112 includes plural beam adjustment components that adjust the orientation of an input beam from the beam dividing device 108, and output an adjusted beam. For example, the plural beam adjustment components include a control optic 200, a control optic 202, a polarization cube 204, a polarization periscope 206, a polarization cube 208, and a mirror 210. The control optic 200 receives as input the optical beam 106 outputted from the optical emission device 104. The control optic 200 is an input optic for the spectral bandwidth of interest having very high transmission with the spectral bandpass, and very high attenuation of spectral content outside of the spectral bandpass. For example, if the optical emission device 104 is a vertical beam source with a bandwidth from 400 nm to 2100 nm, if the frequency presence modulation unit 112 is designed to channelize the band from 500 nm to 600 nm, the control optic 200 would allow light to pass through it in the 500 nm to 600 nm range, and not allow light outside of the 500 nm to 600 nm range into the frequency presence modulation unit 112. The control optic 202 can be used to collimate the beam outputted from the control optic 200. The polarization cube 204 can be a high extinction coefficient (for example, >$10^5$) polarization cube oriented to reflect vertically polarized light. This removes residual horizontal polarized light by transmitting the residual horizontal polarized light to the beam dump 228 (i.e., a photon graveyard) located in line with the polarization cube 204. The polarization periscope 206 is a sequence of mirrors (e.g., two mirrors) which changes the vertical height of the laser beam and also rotates the polarization from vertical to horizontal. The polarization cube 208 can be a high extinction coefficient (for example, >$10^5$) polarization cube oriented to reflect any residual vertically polarized light into the beam dump 230 and transmit the horizontal polarized light onto the mirror 210 which reflects the light onto the grating 212.

In FIG. 2, the frequency presence modulation unit 112 also includes a grating 212 that receives the adjusted beam from the plural beam adjustment components (e.g., 200, 202, 204, 206, 208, and 210), disperses the spectral content of the adjusted beam, and redirects the dispersed spectral content. The frequency presence modulation unit 112 also includes a focusing mirror 214 that receives the dispersed spectral content from the grating 212 and focuses the dispersed spectral content. The focusing mirror 214 is a reflective mirror that properly disperses (separates) the wavelengths (frequencies) of the spectral band across the digital mirror array 216. The focusing mirror 214 can be, for example, a metallic coated mirror, a dielectric coated mirror, etc. Metallic coated mirrors are generally polarization insensitive (i.e., reflectivity does not change) and dielectric coated mirrors are polarization sensitive (reflectivity does change). The type of mirror can be selected based on whether it will be used for vertical polarized light or horizontal polarized light.

The frequency presence modulation unit 112 also includes a digital mirror array 216 that receives the focused and dispersed spectral content from the focusing mirror 214 and performs the spectral segregation of the bandwidth of the at least one communication band into the plural channels by adjusting at least one digital mirror in the digital mirror array 216. The mirrors in the digital mirror array 216 can be controlled electronically so that their angle relative to the incident beam can be changed, which changes the propagation direction of the reflected beam. In an exemplary embodiment, the digital mirror array 216 can be a 1,024× 1,024 array of mirrors. However, it is possible that only a section of the array is controlled by the controller 110. For example, a 3×1,024 section can be controlled so that the refresh rate is optimized.

The frequency presence modulation unit 112 also includes a pin diode array 218 that is used to convert light received onto the array into electrical current that is sent to the controller 110 for verification of the data encoding. In the code verification sequence of FIG. 2, the digital mirrors in the digital mirror array 216 are in the "off" state (i.e., position/angle), and all of the light that is input into the frequency presence modulation unit 112 ends up on the pin diode array 218. That is, light incident on the grating 212 is spectrally dispersed onto the digital mirror array 216, which reflects the light onto the pin diode array 218. The code verification sequence shown in FIG. 2 can detect abnormalities in the components of the frequency presence modulation unit 112, because you expect to receive the same frequencies on the pin diode array 218 as those inputted into the frequency presence modulation unit 112. If this is not the case, the controller 110 can make this determination by comparing the frequencies detected by the pin diode array 218 to the frequencies inputted into the frequency presence modulation unit 112. The non-transmit mode is equivalent to a sequence of zeroes (off states) being transmitted and sequence of ones (on states) being verified.

The frequency presence modulation unit 112 also includes several components that are not used in the code verification sequence of FIG. 2, i.e., a focusing grating 220, a control optic 222, a pin hole aperture 224, a mirror 226, a polarization periscope 232, a mirror 234, a control optic 236, and a mirror 238. These components will be explained with reference to FIG. 3.

Figure 3:
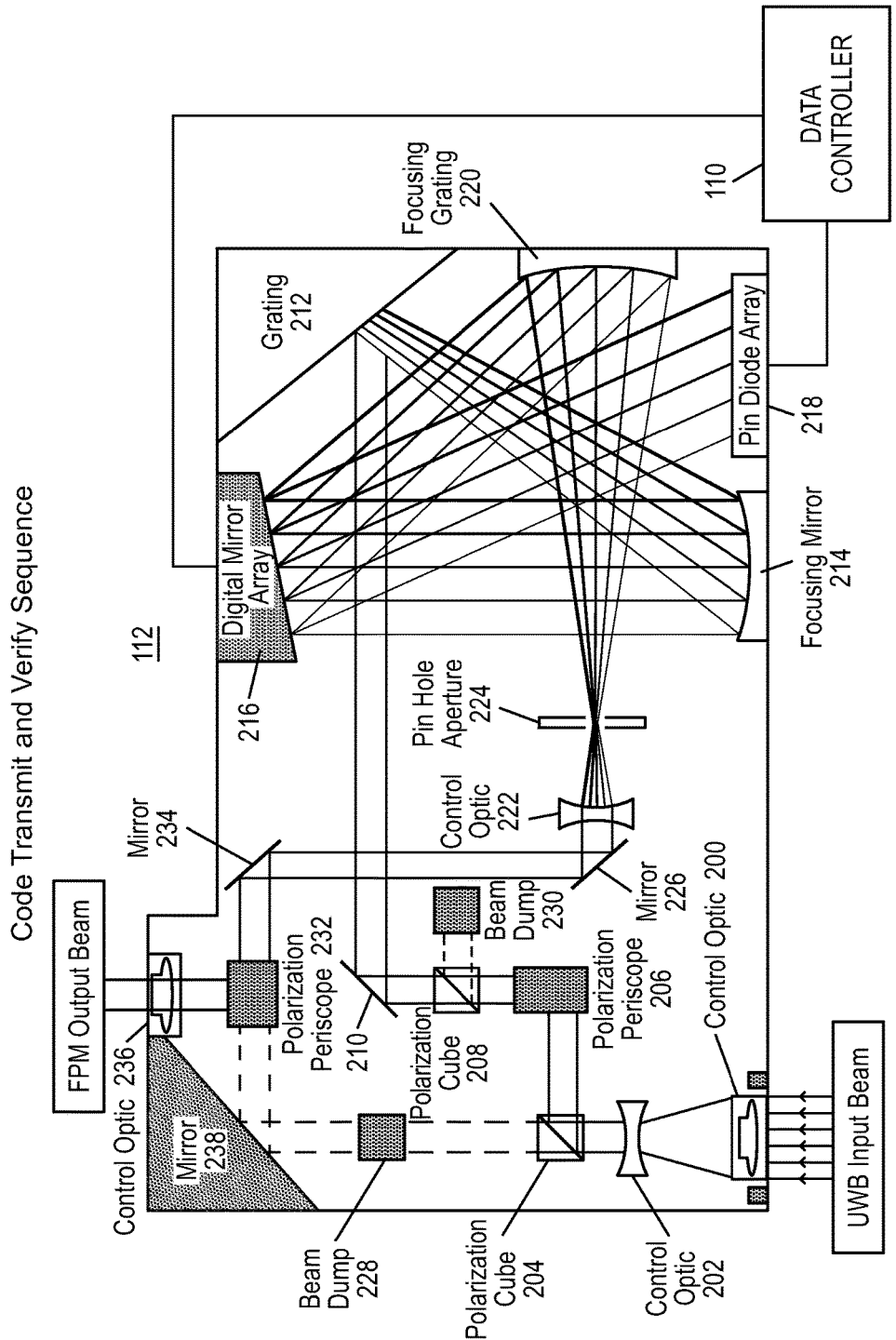
FIG. 3 illustrates a hardware architecture of the frequency presence modulation unit in accordance with an exemplary embodiment.

FIG. 3 is an exemplary embodiment showing the hardware architecture of the frequency presence modulation unit 112 during a code transmit and verify sequence in which channelizing of the pulse occurs. During code transmission and verification, digital mirrors in the digital mirror array 216 are in an active state, and the angle relative to the incident beam is being electronically changed, which changes the propagation direction of the incident beam. In FIG. 3, the components upstream of the focusing mirror 214 function the same as in FIG. 2, i.e. the control optic 200, the control optic 202, the polarization cube 204, the beam dump 228, the polarization periscope 206, the polarization cube 208, the beam dump 230, the mirror 210, the grating 212, and the focusing mirror 214. For data transmission by the frequency presence modulation unit 112, the relative positions of individual mirrors in the digital mirror array 216 are electronically changed, sending certain wavelengths of light within a spectral band onto the focusing grating 220, while other individual mirrors remain in their non-transmit mode position sending certain wavelengths of light within a spectral band onto the pin diode array 218. That is, the focusing grating 220 receives and focuses a first set of wavelengths of the focused and dispersed spectral content reflected by the digital mirror array 216. The first set of wavelengths is ultimately outputted from the frequency presence modulation unit 112 to the telescope 114 for inclusion in the optical output signal to be transmitted to the data receiver 116. The focusing grating 220 is used to spatially recombine the transmission wavelengths (which were dispersed or separated for data encoding purposes by the grating 212). The dispersion process of the grating 212 leads to spatial and temporal changes in the beam which the focusing grating 212 corrects to maximize the coupling efficiency to the transmission telescope 114.

The pin diode array 218 receives a second set of wavelengths of the focused and dispersed spectral content reflected from the digital mirror array 216 and converts the second set of wavelengths into electrical current which is sent to the controller 110. The second set of wavelengths received by the pin diode array 218 are not transmitted by the telescope 114 and are used for data verification. Light incident onto the focusing grating 220 is focused through a pin hole aperture 224 for beam clean-up and onto the control optic 222. The pin hole aperture 224 receives the first set of wavelengths that are reflected from the focusing grating 220. The pin hole aperture 224 insures proper beam quality and is used to maximize the coupling efficiency to the transmission telescope 114. After the pin hole aperture 224, the beam travels to the control optic 222 which is an optic for collimating the beam after data encoding. Collimation of the beam maximizes the coupling efficiency to the transmission telescope 114. Next, the transmission beam arrives at a polarization periscope 232 (via mirrors 226 and 234) that performs a polarization rotation of the collimated beam received from the control optic 222. The polarization periscope 232 switches the horizontal beam back to a vertical beam. This removes residual polarized horizontal light which proceeds to the beam dump 228 via a mirror 238. Next, a control optic 236 transmits the rotated and collimated beam to the telescope (114). The beam reflected through the control optic 236 yields the frequency presence modulation output beam.

The frequency presence modulation unit 112 of FIGS. 2 and 3 has been described above as receiving vertical polarization components, however a frequency presence modulation unit 112 can also be used that receives horizontal polarization components. When pulse energy in a given band is separated into its vertical and horizontal polarization components, the total number of bands available for optical encoding is doubled. A frequency presence modulation unit 112 for horizontal light utilizes the same components as a frequency presence modulation unit for vertical light (i.e., the frequency presence modulation unit 112 in FIGS. 2 and 3), but the relative positions of mirrors, beam dumps, and polarization periscopes are modified. For example, the beam dump 228 could be swapped with the polarization periscope 206. The polarization periscope 206 would be located at a position closer to the polarization cube 204 than the beam dump 228. The mirror 210 would be moved to the left to reflect the horizontally polarized beam onto the grating 212. The polarization cube 208 would be moved forward (i.e., towards the bottom of FIG. 2) and reoriented 90 degrees clockwise to reflect residual vertical polarized light into the beam dump that would not be positioned in the location previously occupied by the polarization cube 208.

As shown in FIG. 1, the data transmitter 102 also includes a controller 110 for providing a control signal to the frequency presence modulation unit 112 to spectrally segregate the bandwidth of the at least one communication band into the plural channels. Specifically, as seen in FIG. 2, the controller 110 provides a control signal to the digital mirror array 216 to segregate the bandwidth of the at least one communication band into the plural channels. The control signal can control the individual mirrors in the array to control whether each mirror is in the transmit position in which certain wavelengths are directed onto the focusing grating or in the non-transmit position in which certain wavelengths are directed onto the pin diode array 218. In an exemplary embodiment, the controller 110 includes a computer processor. The computer processor may be a single hardware processor, a plurality of hardware processors, or combinations thereof. Hardware processor devices may have one or more processor "cores." The controller 110 may be special purpose or general purpose hardware processor devices. The controller 110 may be connected to a communication infrastructure, such as a bus, message queue, network, multi-core message-passing scheme, etc. The network may be any network suitable for performing the functions as disclosed herein and may include a wireless network (e.g., Wi-Fi), a mobile communication network, a satellite network, fiber optic, coaxial cable, infrared, radio frequency (RF), or any combination thereof. Other suitable network types and configurations will be apparent to persons having skill in the relevant art. The controller 110 may also include a memory (e.g., random access memory, read-only memory, etc.). The memory may be read from and/or written to in a well-known manner. In an embodiment, the memory may be non-transitory computer readable recording media. The controller 110 can perform the data verification, or this can be performed in a data verification device 124. The controller 110 operates based on a signal received from a clock and timing device 122. The clock and timing device 122 receives a signal from the optical emission device 104.

Figure 4:
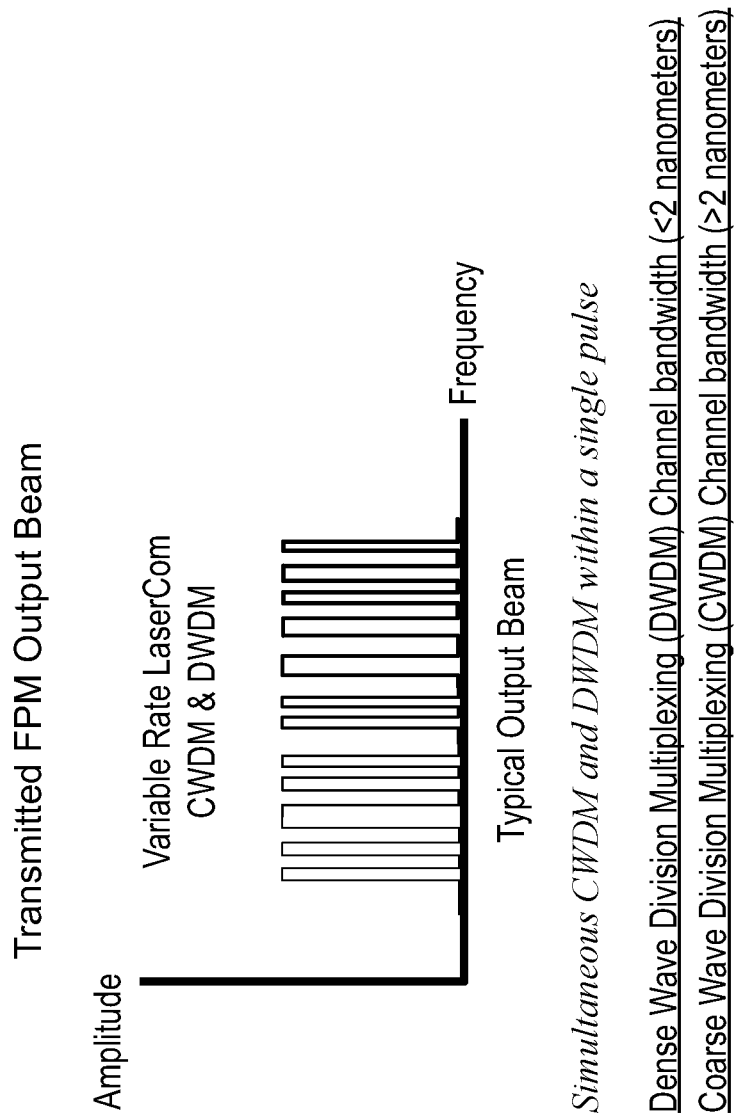
FIG. 4 illustrates a transmitted frequency presence modulation output beam in accordance with an exemplary embodiment.

As shown in FIG. 1, the data transmitter 102 also includes a telescope 114 configured to transmit the optical output signal to a data receiver 116. An example of the optical output signal is shown in FIG. 4. FIG. 4 shows dense wave division multiplexing and coarse wave division multiplexing within one output beam, which provides a variable data rate. As seen in FIG. 4, the spectral content of certain frequencies is present, and the spectral content of certain frequencies is not present. In an exemplary embodiment, the transmitted output beam can be encrypted. Examples of cryptographic modules/encryption schemes that could be used include: NIST FIPS 140-2, AES 256, Ciena 6500 Flex3 WaveLogic 3e OCLD, Check Point CryptoCore, FIPS Crypto Module by Ionic Security Inc., Tanium Cryptographic Module, etc.

As shown in FIG. 1, the data transmitter 102 also includes a voltage management device 120 and a power management device 118 that are connected to the frequency presence modulation unit 112.

Figure 5:
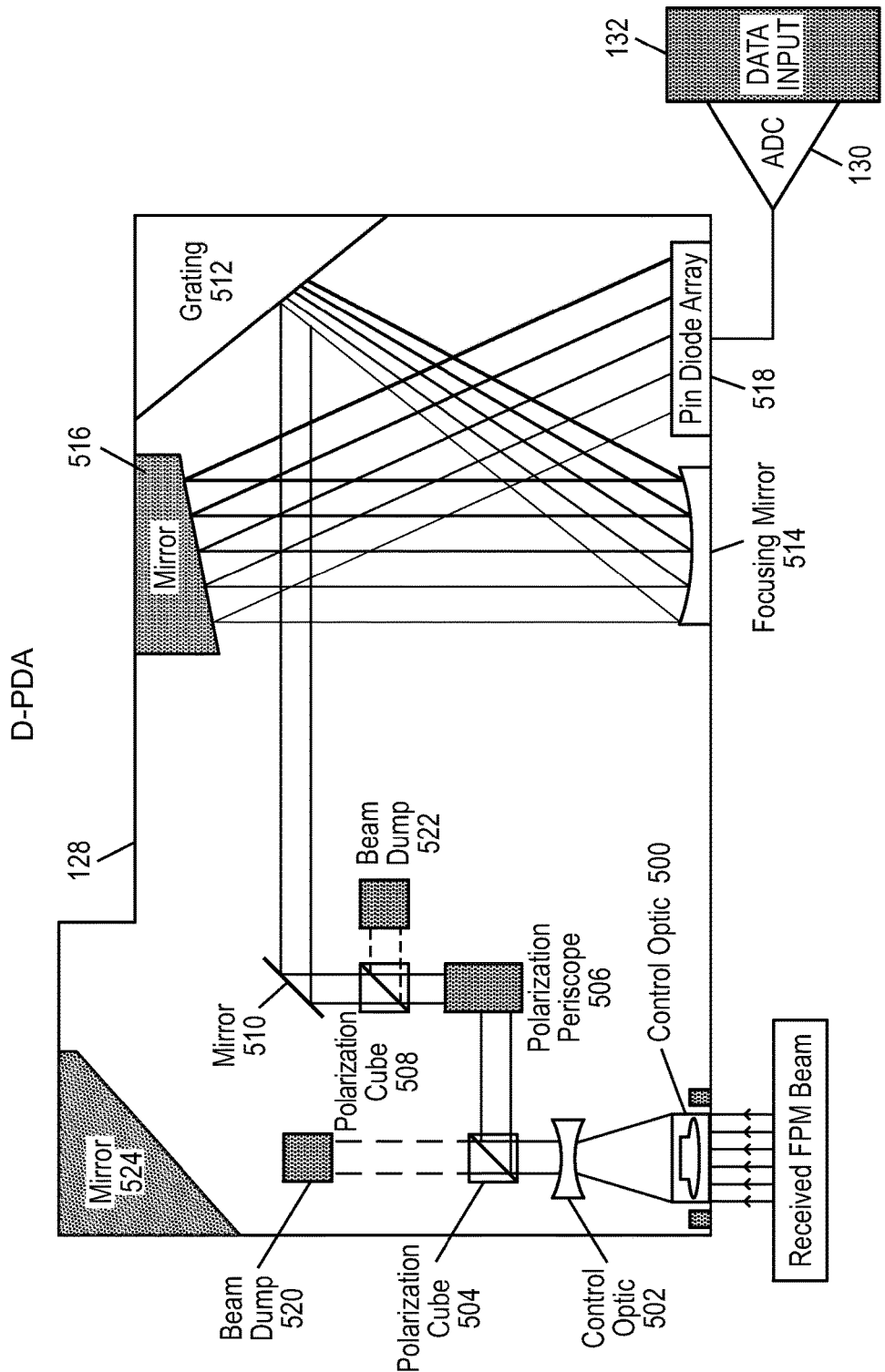
FIG. 5 illustrates a hardware architecture of a receiver in accordance with an exemplary embodiment.

Further details of the components of the data receiver 116 are shown in FIGS. 1 and 5, and are discussed next. As seen in FIG. 1, some of the components present in the data transmitter 102 are also present in the data receiver 116. The data receiver 116 includes a telescope 126 to receive the optical output signal (i.e., the frequency presence modulation output beam) transmitted by the telescope 114. A digital photodiode array (D-PDA) 128 receives a beam output from the telescope 126. FIG. 5 shows the components of the digital photodiode array 128, some of which are the same or similar to the components of the frequency presence modulation unit 112 of the data transmitter 102. The control optic 500, control optic 502, polarization cube 504, beam dump 520, polarization periscope 506, polarization cube 508, beam dump 522, mirror 510, grating 512, focusing mirror 514, pin diode array 518, and mirror 524 are similar or the same as the control optic 200, control optic 202, polarization cube 204, beam dump 220, polarization periscope 206, polarization cube 208, beam dump 222, mirror 210, grating 212, focusing mirror 214, pin diode array 218, and mirror 238, respectively. In FIG. 5, the mirror 516 can be a standard fixed mirror, as all of the light of the spectral band is reflected onto the pin diode array 518 to determine which wavelengths are present. An analog-to-digital converter 130 receives an electrical signal that is outputted from the digital photodiode array 128. After the digital photodiode array 128, the signal enters a data input device 132 that includes a field programmable gate array. The output of the data input device 132 can be in the Ethernet format, for example. A host processor 134 receives the Ethernet signal, and decodes the received data corresponding to the frequency presence modulation output beam received by the telescope 126. The host processor 134 is connected to a clock and timing device 138, a voltage management device 140, and a power management device 142. The host processor 134 is connected to a data output device 136 that can be any type of data output section, i.e., firewire, Ethernet, HDMI, toslink, VGA, Wi-Fi, etc.

An exemplary method performed by the data receiver 116 includes receiving, by the telescope 126, the optical output signal transmitted by the telescope 114. The method also includes receiving, by the digital photodiode array 128, a beam output from the telescope 126. Next, the method includes receiving, by the analog-to-digital converter 130, an output electrical signal from the digital photodiode array 128.

FIG. 7 shows an array 700 of n frequency presence modulation units 112 and how they are connected to the telescope 114 and the optical emission device 104. The n frequency presence modulation units 112 each channelize bands having different frequencies. The optical emission device 104 outputs an optical beam that is reflected by a broadband reflector 702, and then the beam is redirected by a spectral bandpass filter 704 that is associated with each of the frequency presence modulation units 112. The beam is routed via a spectral bandpass filter 704 to the associated frequency presence modulation unit 112. The components of each frequency presence modulation unit 112 are the same or similar to those shown in FIGS. 2 and 3. Each frequency presence modulation unit is designed for the particular frequency band it will channelize. The beam outputted by each frequency presence modulation unit 112 is directed by one or more mirrors 706 to the telescope 114 for transmission. The mirrors 706 can be, for example, highly reflective mirrors.

Where the present disclosure is implemented using software, the software may be stored in a computer program product or non-transitory computer readable medium and loaded into the controller 110 using a removable storage drive or a communications interface.

Figure 8:
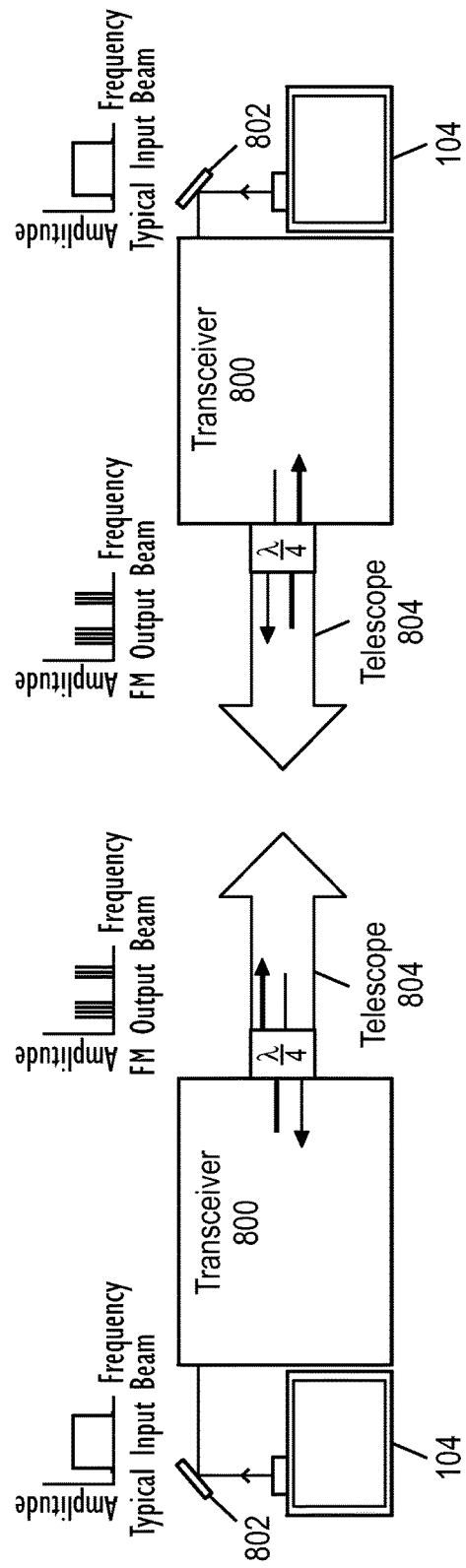
FIG. 8 is a block diagram illustrating a system hardware architecture in accordance with an exemplary embodiment.

FIG. 8 is a block diagram illustrating a system hardware architecture in accordance with an exemplary embodiment. The system for optical communication in FIG. 8 includes two transceivers 800. Each transceiver 800 has a data transmission section 902 (i.e., a data transmitter) and a data reception section 904 (i.e., a data receiver) (shown in FIG. 9). Each transceiver 800 is connected to the optical emission device 104, a mirror 802, and a telescope 804. In an exemplary embodiment, the data transmission section 902 of the transceiver 800 includes the same components as the data transmitter 102 in FIGS. 1-3, and these components perform the same functions as described above. In an exemplary embodiment, the data transmission section 902 in the transceiver 800 does not include one or more components included in the data transmitter 102 in FIGS. 1-3, as in FIGS. 10 and 12. In an exemplary embodiment, the data reception section 904 in the transceiver 800 includes the same components as in the data receiver 116 in FIGS. 1 and 5, and these components perform the same functions described above. In an exemplary embodiment, the data reception section 904 in the transceiver 800 does not include one or more components included in the data receiver 116 in FIGS. 1 and 5, as in FIGS. 10 and 12. The telescope 804 is the same or similar to the telescope 114 in FIG. 1. The at least one optical emission device 104 is the same or similar to the optical emission device 104 in FIG. 1.

Figure 9:
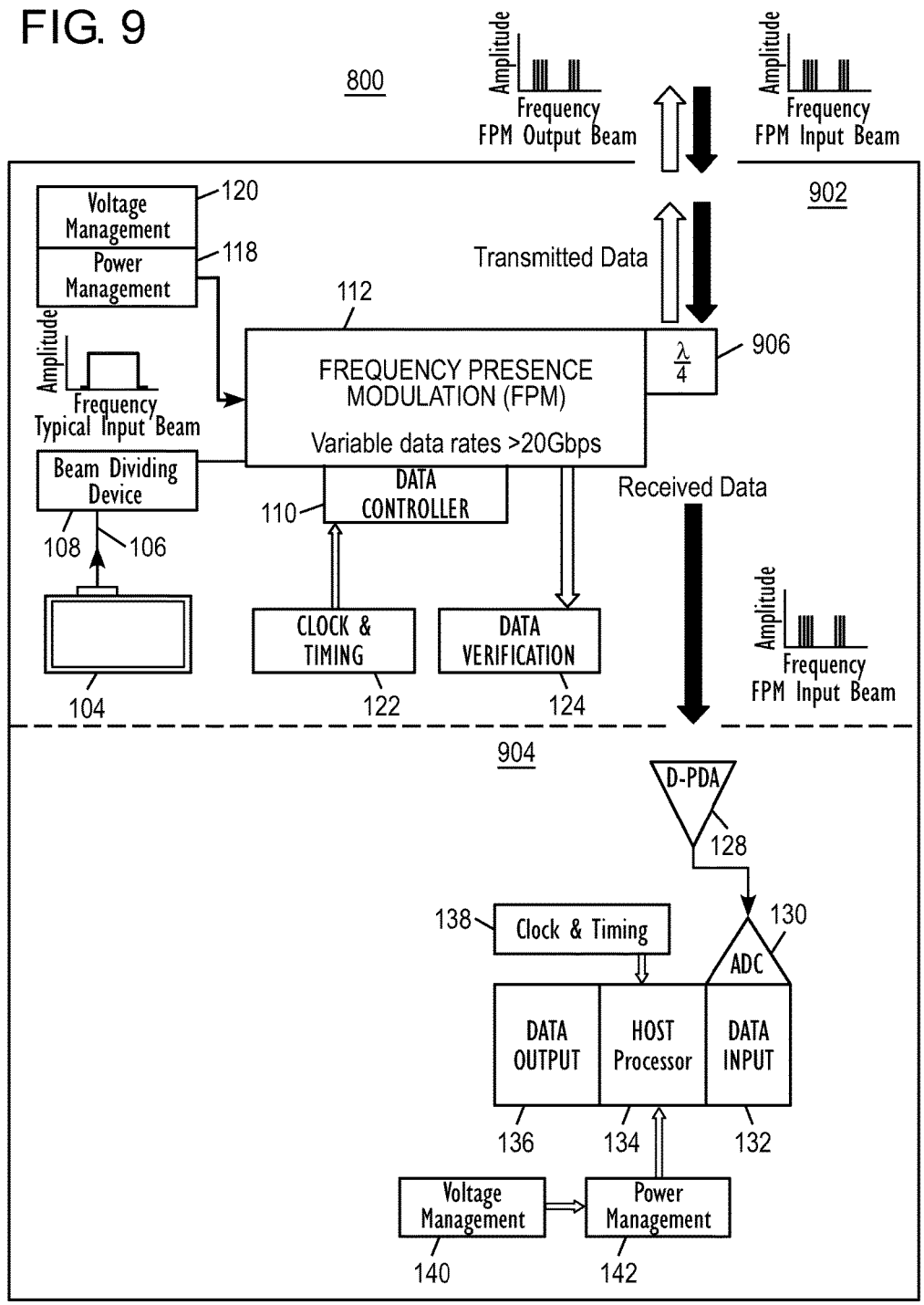
FIG. 9 is a block diagram illustrating a transceiver hardware architecture in accordance with an exemplary embodiment.

FIG. 9 shows the components of the data reception section 904 and the data transmission section 902 of the transceiver 800, and the flow of the transmitted data sent by the transceiver 800, and the flow of the data received by the transceiver 800. In FIG. 9, the data that is inputted into the data transmission section 902 (the optical input signal) can be received by the telescope 804. The received data passes through the data transmission section 902 and enters the data reception section 904, where it enters the digital photodiode array 128 for processing. In FIG. 9, the data to be transmitted (the optical output signal) is outputted from the frequency presence modulation unit 112 and proceeds to the data transmission section 902. The optical output signal can then proceed to the telescope 804 for transmission.

Figure 10:
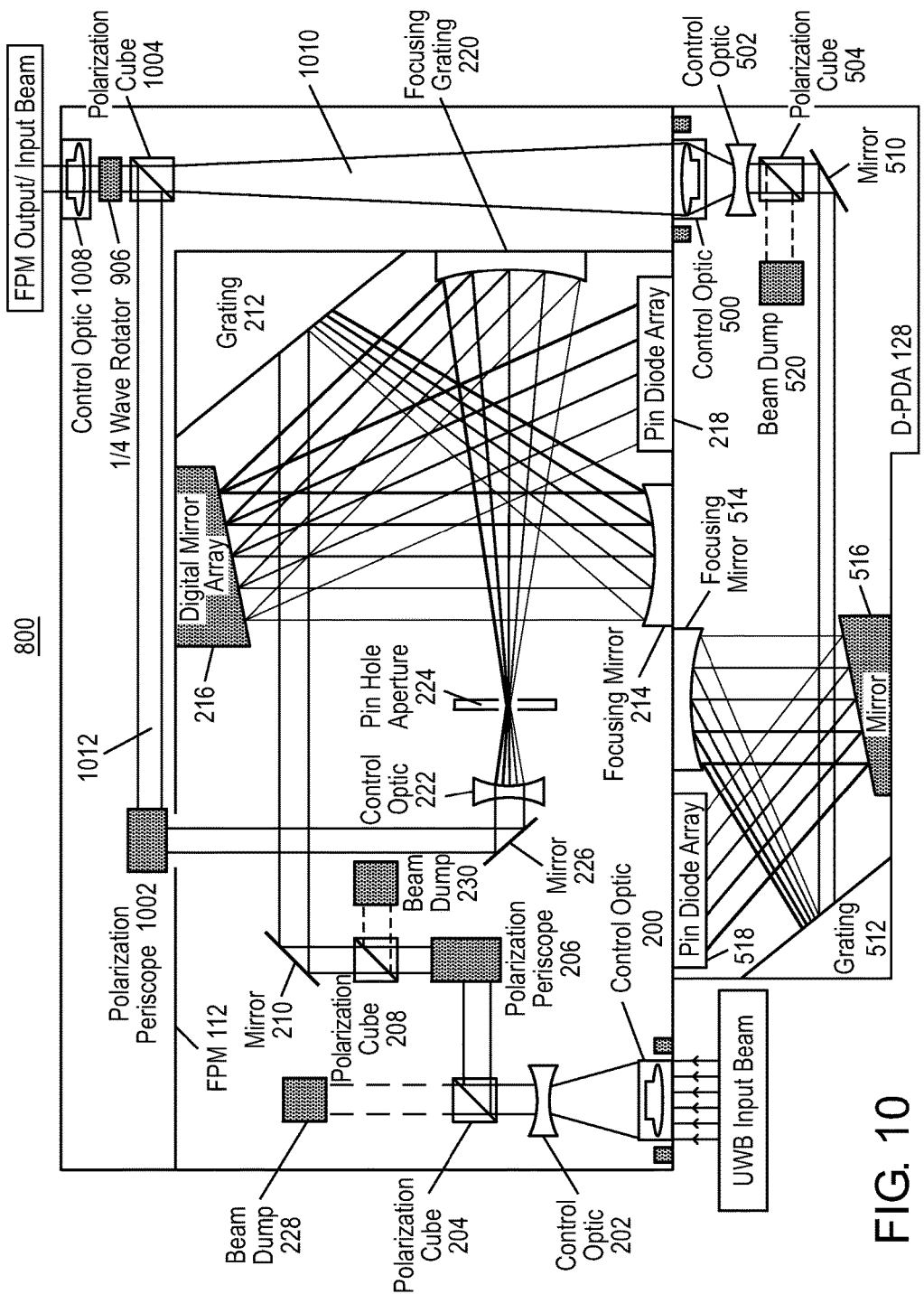
FIG. 10 is a block diagram illustrating a hardware architecture in accordance with an exemplary embodiment.
Figure 12:
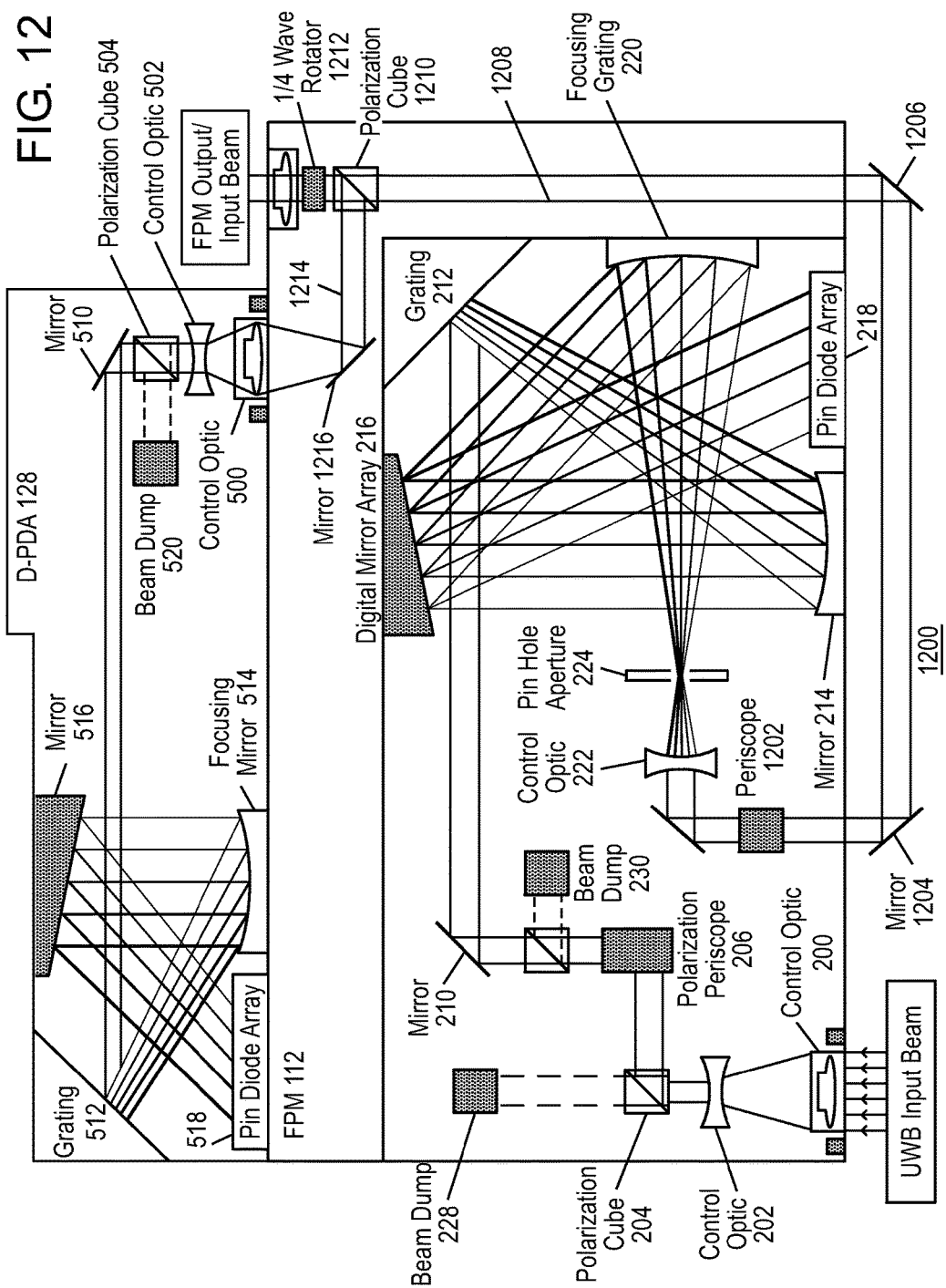
FIG. 12 is a block diagram illustrating a hardware architecture in accordance with an exemplary embodiment.

In an exemplary embodiment, the telescope 804 is configured to transmit the optical output signal and configured to receive an optical input signal. In an exemplary embodiment, the telescope 804 is configured to transmit the optical output signal and receive an optical input signal simultaneously. FIGS. 10 and 12 show components of the transceiver 800 during simultaneous transmission and reception. The data reception section 904 includes the digital photodiode array 128 shown in greater detail in FIGS. 10 and 12.

As seen in FIG. 10, the transceiver 800 includes, for example, the frequency presence modulation unit 112, the digital photodiode array 128, a polarization periscope 1002, a polarization cube 1004, a quarter wave rotator 906, and a control optic 1008. In an exemplary embodiment, the polarization cube 1004 and the quarter wave rotator 906 can be contained in a housing that is separate from the housing of the transceiver 800. Alternatively, the polarization cube 1004 and the quarter wave rotator 906 can be contained within the housing of the transceiver 800.

Figure 11:
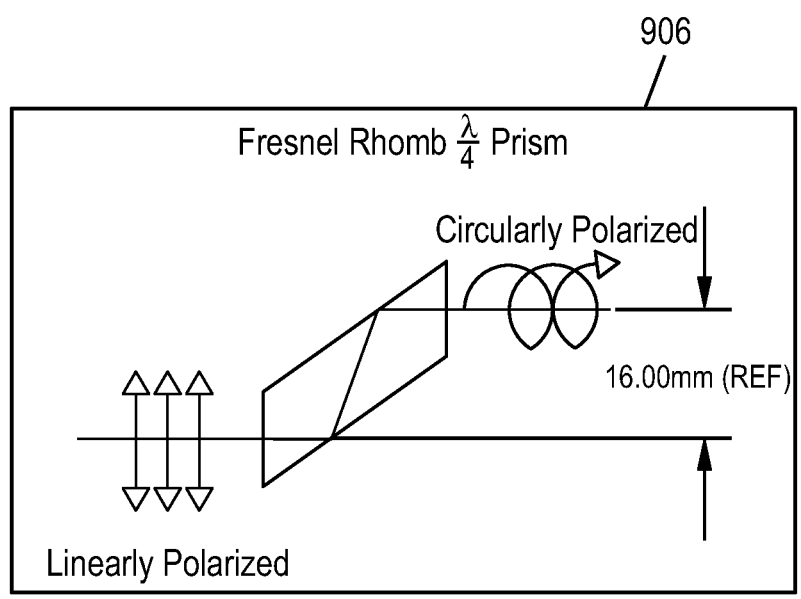
FIG. 11 is a diagram illustrating a quarter wave rotator in accordance with an exemplary embodiment.

In an exemplary embodiment, the optical input signal received by the telescope 804 is circularly polarized. The circularly polarized optical input signal passes through the control optic 1008 and enters the quarter wave rotator 906. In an exemplary embodiment, the telescope 804 is not used, and the optical input signal is received by the data transmission section 902 of the transceiver 800 and the optical output signal is transmitted by the data transmission section 902. In FIG. 10, the quarter wave rotator 906 is configured to rotate the circularly polarized optical input signal so it becomes linearly polarized for reception by the data reception section 904, and ultimately for reception by the digital photodiode array 128. For example, in FIG. 10, the quarter wave rotator 906 rotates the circularly polarized optical input signal so it becomes horizontally polarized for reception by the data reception section 904 and the digital photodiode array 128. FIG. 11 shows an exemplary quarter wave rotator 906. In FIG. 11, the quarter wave rotator 906 is a Fresnel Rhomb quarter wave prism. The Fresnel Rhomb quarter wave prism is used for broadband polarization rotator, while a quarter wave plate is used as a narrow band polarization rotator. In FIG. 10, the polarization cube 1004 directs the linearly polarized optical input signal (e.g., horizontally polarized optical input signal) to the digital photodiode array 128. For example, the polarization cube 1004 allows the horizontally polarized optical input signal to be transmitted through it and to the data reception section 904 and the digital photodiode array 128. The components of the digital photodiode array 128 process the linearly polarized optical input signal in a similar manner as in FIG. 5 discussed above.

In an exemplary embodiment, as seen in FIG. 10, the digital photodiode array 128 is configured to receive a beam 1010 that is based on the optical input signal (FPM Input Beam shown at the upper right corner of FIG. 10) received from the telescope 804. The analog-to-digital converter 130 receives an electrical signal outputted from the digital photodiode array 128.

In an exemplary embodiment, the data transmission section 902 includes at least one optical emission device 104 configured to output light energy as an optical beam having an operating bandwidth. The data reception section 904 includes the frequency presence modulation unit 112. The frequency presence modulation unit 112 is configured to spectrally segregate the bandwidth of the at least one communication band into plural channels. The frequency presence modulation unit 112 is also configured to modulate the bandwidth portion to selectively produce an optical output signal with wavelengths that correspond to one or more of the channels. The presence and absence of energy within channels of the communication band will constitute an information packet for data communication.

In an exemplary embodiment, the transceiver 800 includes an optical pathway for bi-directional optical communication over a common optical path for transmitting the optical output signal (produced by the frequency presence modulation unit 112) and for receiving an optical input signal that is received by the data transmission section 902 of the transceiver 800. FIG. 9 shows the common optical path as the area including both the upward and downward pointing arrows and the quarter wave rotator 906. The data reception section 904 is configured to receive the optical input signal from the optical pathway.

In an exemplary embodiment, the optical output signal produced by the frequency presence modulation unit 112 is linearly polarized. For example, the optical output signal produced by the frequency presence modulation unit 112 is vertically polarized. In FIG. 10, a beam 1012 that exits a polarization periscope 1002 and travels to the polarization cube 1004 is vertically polarized.

In an exemplary embodiment, the polarization cube 1004 directs the linearly polarized (i.e., vertically polarized) optical output signal to the quarter wave rotator 906, and the quarter wave rotator 906 rotates the linearly polarized (i.e., vertically polarized) optical output signal so it becomes a circularly polarized optical output signal for transmission by the telescope 804. The telescope 804 transmits the circularly polarized optical output signal. Thus, in FIG. 10, the polarization cube 1004 transmits the horizontally polarized optical input signal received by the telescope 804, and reflects the vertically polarized optical output signal that is received from the frequency presence modulation unit 112 and is to be transmitted by the telescope 804.

Similar to FIG. 7, the transceiver 800 can utilize an array of n frequency presence modulation units 112 that are connected to the telescope 804 and the optical emission device 104. Then frequency presence modulation units 112 each channelize bands having different frequencies.

In an exemplary embodiment, the optical communication system includes a data transmitter (e.g., data transmitter 102 as shown in FIG. 1, data transmitter 902 as shown in FIG. 9, etc.). The data transmitter 102, 902 includes at least one optical emission device 104 configured to output light energy as an optical beam having an operating bandwidth, a beam dividing device 108 arranged to receive and divide the operating bandwidth of the optical beam into bandwidth portions of plural communication bands, a focusing grating 220, and a digital mirror array 216 having a plurality of digital mirrors. In an imaging mode, the optical communication system is configured to perform hyperspectral imaging by setting all of the plurality of digital mirrors to positions that transmit all wavelengths of a communication band among the plural communication bands to the focusing grating 220. That is, no wavelengths of the communication band are transmitted to the pin diode array 218 during the imaging mode.

In an exemplary embodiment, the focusing grating 220 is configured to focus all of the wavelengths of the communication band to produce an optical output signal for transmission. For example, the focusing grating 220 focuses all of the wavelengths of the communication band towards the pin hole aperture 224 and onto the control optic 222.

In an exemplary embodiment, the optical communication system includes a telescope 114 configured to transmit the optical output signal.

In an exemplary embodiment, the optical communication system includes a frequency presence modulation unit 112 that includes the digital mirror array 216 and the focusing grating 220. The frequency presence modulation unit 112 includes plural beam adjustment components (e.g., control optic 202, polarization cube 204, polarization periscope 206, polarization cube 208, mirror 210) that adjust the orientation of an input beam from the beam dividing device 108, and output an adjusted beam (e.g., the beam reflected from the mirror 210 in FIG. 3). The frequency presence modulation unit 112 includes a grating 212 that receives the adjusted beam from the plural beam adjustment components, disperses the spectral content of the adjusted beam, and redirects the dispersed spectral content. Also, the frequency presence modulation unit 112 includes a focusing mirror 214 that receives the dispersed spectral content from the grating 212 and focuses the dispersed spectral content onto the digital mirror array 216. That is, the adjusted beam moves from the grating 212 to the focusing mirror 214, from the focusing mirror 214 to the digital mirror array 216, and from the digital mirror array 216 to the focusing grating 220.

In an exemplary embodiment, the optical communication system includes a controller 110 for providing a control signal to the frequency presence modulation unit 112 to control the positions of the plurality of digital mirrors of the digital mirror array 216.

In an exemplary embodiment, when the optical communication system is in a communication mode (e.g., communicating data by transmitting light), the digital mirror array 216 is configured to spectrally segregate a bandwidth portion of at least one communication band into plural channels by adjusting at least one digital mirror in the digital mirror array 216. The digital mirror array 216 is also configured to modulate the bandwidth portion to selectively produce an optical output signal with wavelengths that correspond to one or more of the channels. A presence and absence of energy within channels of the communication band will constitute an information packet for data communication.

In an exemplary embodiment, the focusing grating 220 is configured to receive and focus a first set of wavelengths of the optical output signal reflected by the digital mirror array 216. The first set of wavelengths is outputted to a telescope 114 for transmission. A detector 218 is configured to receive a second set of wavelengths from the digital mirror array 216 and convert the second set of wavelengths into electrical current. The second set of wavelengths received by the detector 218 are not transmitted by the telescope 114 and are used for data verification. The detector 218 can be a hyperspectral detector configured to detect presence or absence of light of a particular wavelength and amplitude of the light of the particular wavelength. An advantageous feature of the optical communication system of the present disclosure is that the overall data rate can be increased by introducing amplitude modulation within the frequency modulation scheme discussed above. The detector 218 can also be, for example, a pin diode array, a high-speed (greater than 20 MHz) hyperspectral camera, photodiode array, charge-coupled device (CCD) array, etc.

Space platforms and missions are often limited by size, weight, and power (SWaP), which as a consequence limits the extent of missions and capabilities that a space platform or mission could undertake. An advantageous feature of the optical communication system of the present disclosure is that it combines two critical applications (communications and active imaging (e.g., active hyperspectral imaging)) into one dual use system. As a result, the hardware SWaP requirement is halved. The hyperspectral imaging function of the optical communication system can be used for surveillance (e.g., military surveillance), imaging of space objects, weather monitoring, crop disease monitoring, etc.

In an exemplary embodiment, a transceiver 800 includes the data transmitter 902 discussed above and a data receiver 904.

Figure 13:
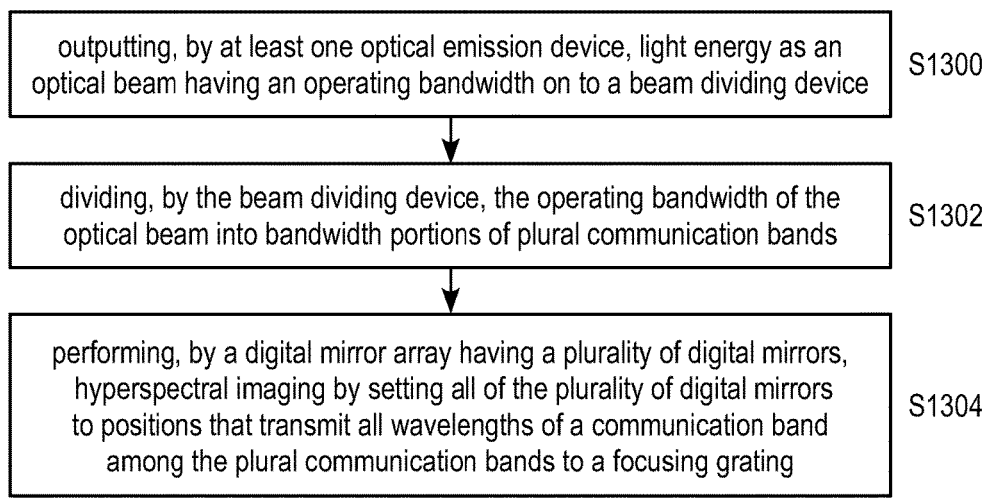
FIG. 13 is a flow chart illustrating a method according to an exemplary embodiment.

FIG. 13 shows an exemplary method for optical communication using the transceiver 800 shown in FIGS. 8-10. In step S1300, the at least one optical emission device 104 outputs light energy as an optical beam having an operating bandwidth on to a beam dividing device 108. In step S1302, the beam dividing device 108 divides the operating bandwidth of the optical beam into bandwidth portions of plural communication bands. In step S1304, a digital mirror array 216 having a plurality of digital mirrors, performs hyperspectral imaging by setting all of the plurality of digital mirrors to positions that transmit all wavelengths of a communication band among the plural communication bands to a focusing grating 220.

In an exemplary embodiment, the method includes receiving, on the focusing grating 220, all of the wavelengths of the communication band; and focusing, with the focusing grating 220, all of the wavelengths of the communication band to produce an optical output signal for transmission.

In an exemplary embodiment, the method includes transmitting, by a telescope 114, the optical output signal to an object to be imaged.

In an exemplary embodiment, the method includes collecting, by a data receiver 116, reflected light from the object; and converting, by a photodetection device (e.g., a pin diode array 128) of the data receiver 116, the reflected light into an electrical signal in order to produce an image of the object. The photodetection device converts photon energy into electrical energy.

In an exemplary embodiment, the method includes adjusting, by plural beam adjustment components, the orientation of an input beam from the beam dividing device 108, and outputting an adjusted beam; and receiving, on a grating 212, the adjusted beam from the plural beam adjustment components. The method also includes dispersing, by the grating 212, the spectral content of the adjusted beam, and redirecting the dispersed spectral content; and receiving, on a focusing mirror 214, the dispersed spectral content from the grating 212 and focusing the dispersed spectral content onto the digital mirror array 216.

In an exemplary embodiment, the method includes controlling the digital mirror array 216 with a controller 110.

In an exemplary embodiment, the method includes spectrally segregating, by the digital mirror array 216, a bandwidth portion of at least one communication band into plural channels by adjusting at least one digital mirror in the digital mirror array 216. The method also includes modulating, by the digital mirror array 216, the bandwidth portion to selectively produce an optical output signal with wavelengths that correspond to one or more of the channels. A presence and absence of energy within channels of the communication band will constitute an information packet for data communication.

In an exemplary embodiment, the method includes receiving, on a focusing grating 220, a first set of wavelengths of the optical output signal reflected by the digital mirror array 216 and focusing the first set of wavelengths by the focusing grating 220; and outputting the first set of wavelengths to a telescope 114 for transmission. The method also includes receiving, on a detector 218, a second set of wavelengths from the digital mirror array 216 and converting the second set of wavelengths into electrical current. The second set of wavelengths received by the detector 218 are not transmitted by the telescope 114 and are used for data verification.

In an exemplary embodiment, the detector 218 is a hyperspectral detector, and the method includes detecting, with the hyperspectral detector 218, presence or absence of light of a particular wavelength and amplitude of the light of the particular wavelength.

FIG. 12 shows an exemplary transceiver 1200. In the transceiver 1200, the frequency presence modulation unit 112 and the digital photodiode array 128 are in opposite positions than they were in FIGS. 8-10. In FIG. 12, the optical output signal produced by the frequency presence modulation unit 112 is horizontally polarized. Mirrors 1204 and 1206 direct the horizontally polarized optical output signal to a polarization cube 1210. Thus, a beam 1208 received by the polarization cube 1210 is horizontally polarized. The polarization cube 1210 transmits horizontally polarized beams and reflects vertically polarized beams. The horizontally polarized optical output signal produced by the frequency presence modulation unit 112 is rotated by a quarter wave rotator 1212 to be circularly polarized. The circularly polarized optical output signal is transmitted to the common optical path so it can be transmitted by the telescope 804.

When the transceiver 1200 receives a circularly polarized optical input signal via the telescope 804 and the common optical path, the quarter wave rotator 1212 rotates the circularly polarized optical input signal so that it is vertically polarized. The vertically polarized optical input signal that leaves the quarter wave rotator 1212 is received by the polarization cube 1210. The polarization cube 1210 reflects the vertically polarized optical input signal (i.e., beam 1214) to a mirror 1216, which reflects the vertically polarized optical input signal to the digital photodiode array 128, where the signal is processed as above.

Thus, it will be appreciated by those skilled in the art that the disclosed systems and methods can be embodied in other specific forms without departing from the spirit or essential characteristics thereof. The presently disclosed embodiments are therefore considered in all respects to be illustrative and not restricted. It is not exhaustive and does not limit the disclosure to the precise form disclosed. Modifications and variations are possible in light of the above teachings or may be acquired from practicing of the disclosure, without departing from the breadth or scope. The scope of the invention is indicated by the appended claims rather than the foregoing description and all changes that come within the meaning and range and equivalence thereof are intended to be embraced therein.

What is claimed is:

1. An optical communication system, comprising:
    a data transmitter including:
        at least one optical emission device configured to output light energy as an optical beam having an operating bandwidth,
        a beam divider to receive and divide the operating bandwidth of the optical beam into bandwidth portions of plural communication bands,
        a focusing grating, and
        a digital mirror array having a plurality of digital mirrors,
    wherein in an imaging mode, the optical communication system is configured to perform hyperspectral imaging by setting all of the plurality of digital mirrors to positions that transmit all wavelengths of a communication band among the plural communication bands to the focusing grating;
    a frequency presence modulation unit that includes the digital mirror array, the focusing grating, a grating, a focusing mirror, and a detector; and
    a controller for providing a control signal to the frequency presence modulation unit to control the positions of the plurality of digital mirrors.

2. The optical communication system of claim 1, wherein the focusing grating is configured to focus all of the wavelengths of the communication band to produce an optical output signal for transmission.

3. The optical communication system of claim 2, comprising: a telescope configured to transmit the optical output signal.

4. The optical communication system of claim 1, wherein the frequency presence modulation unit comprises:
    plural beam adjustment components that adjust the orientation of an input beam from the beam divider, and output an adjusted beam;
    the grating that receives the adjusted beam from the plural beam adjustment components, disperses the spectral content of the adjusted beam, and redirects the dispersed spectral content; and
    the focusing mirror that receives the dispersed spectral content from the grating and focuses the dispersed spectral content onto the digital mirror array.

5. The optical communication system of claim 1, wherein in a communication mode, the digital mirror array is configured to:
    spectrally segregate a bandwidth portion of at least one communication band into plural channels by adjusting at least one digital mirror in the digital mirror array, and modulate the bandwidth portion to selectively produce an optical output signal with wavelengths that correspond to one or more of the channels, wherein a presence and absence of energy within channels of the communication band will constitute an information packet for data communication.

6. The optical communication system of claim 5, wherein the focusing grating is configured to receive and focus a first set of wavelengths of the optical output signal reflected by the digital mirror array, wherein the first set of wavelengths is outputted to a telescope for transmission; and
    a detector configured to receive a second set of wavelengths from the digital mirror array and convert the second set of wavelengths into electrical current, wherein the second set of wavelengths received by the detector are not transmitted by the telescope and are used for data verification.

7. The optical communication system of claim 6, wherein the detector is a hyperspectral detector configured to detect presence or absence of light of a particular wavelength and amplitude of the light of the particular wavelength.

8. A transceiver comprising the data transmitter of claim 1 and a data receiver.

9. A method for optical communication, the method comprising:
    outputting, by at least one optical emission device, light energy as an optical beam having an operating bandwidth on to a beam divider;
    dividing, by the beam divider, the operating bandwidth of the optical beam into bandwidth portions of plural communication bands;
    performing, by a digital mirror array having a plurality of digital mirrors, hyperspectral imaging by setting all of the plurality of digital mirrors to positions that transmit all wavelengths of a communication band among the plural communication bands to a focusing grating;
    controlling the digital mirror array with a controller;
    adjusting, by plural beam adjustment components, the orientation of an input beam from the beam divider, and outputting an adjusted beam;
    receiving, on a grating, the adjusted beam from the plural beam adjustment components;
    dispersing, by the grating, the spectral content of the adjusted beam, and redirecting the dispersed spectral content; and
    receiving, on a focusing mirror, the dispersed spectral content from the grating and focusing the dispersed spectral content onto the digital mirror array.

10. The method of claim 9, comprising:
    receiving, on the focusing grating, all of the wavelengths of the communication band; and
    focusing, with the focusing grating, all of the wavelengths of the communication band to produce an optical output signal for transmission.

11. The method of claim 10, comprising:
    transmitting, by a telescope, the optical output signal to an object to be imaged.

12. The method of claim 11, comprising:
    collecting, by a data receiver, reflected light from the object; and
    converting, by a pin diode array of the data receiver, the reflected light into an electrical signal in order to produce an image of the object.

13. The method of claim 9, comprising:
    spectrally segregating, by the digital mirror array, a bandwidth portion of at least one communication band into plural channels by adjusting at least one digital mirror in the digital mirror array; and modulating, by the digital mirror array, the bandwidth portion to selectively produce an optical output signal with wavelengths that correspond to one or more of the channels, wherein a presence and absence of energy within channels of the communication band will constitute an information packet for data communication.

14. The method of claim 13, comprising:

receiving, on the focusing grating, a first set of wavelengths of the optical output signal reflected by the digital mirror array and focusing the first set of wavelengths by the focusing grating;

outputting the first set of wavelengths to a telescope for transmission; and receiving, on a detector, a second set of wavelengths from the digital mirror array and converting the second set of wavelengths into electrical current, wherein the second set of wavelengths received by the detector are not transmitted by the telescope and are used for data verification.

15. The method of claim 14, wherein the detector is a hyperspectral detector, and the method comprises:

detecting, with the hyperspectral detector, presence or absence of light of a particular wavelength and amplitude of the light of the particular wavelength.

\* \* \* \* \*